June 19, 1923.

E. S. COLE

TRACTOR

Filed April 14, 1922

1,459,361

Inventor:
E. S. Cole.

By *(signature)*

Attorneys

Patented June 19, 1923.

1,459,361

UNITED STATES PATENT OFFICE.

EUGENE S. COLE, OF COVINGTON, PENNSYLVANIA.

TRACTOR.

Application filed April 14, 1922. Serial No. 552,819.

*To all whom it may concern:*

Be it known that I, EUGENE S. COLE, a citizen of the United States, residing at Covington, in the county of Tioga and State of Pennsylvania, have invented new and useful Improvements in Tractors, of which the following is a specification.

My invention relates to tractors and more particularly to tractors of the motor driven variety which are especially adaptable for farm uses.

The invention has for its primary object the provision of a tractor of the above mentioned character having a novel and improved driving means whereby a comparatively low-powered engine may be employed for hauling heavy loads.

A further object of the invention is to provide a relatively light tractor of the kind stated which may be used on soft ground without danger of its becoming buried therein even should it be unable to draw its load.

A still further object of the invention is to furnish a tractor which is comparatively simple in construction, highly efficient in operation and which may be manufactured and sold at a small cost.

With the above and other objects in view as will become apparent as the description proceeds, the invention comprises a novel combination and arrangement of parts to be hereinafter described and claimed and in order that the same may be better understood, reference is had to the accompanying drawing forming a part of this specification.

Figure 2:
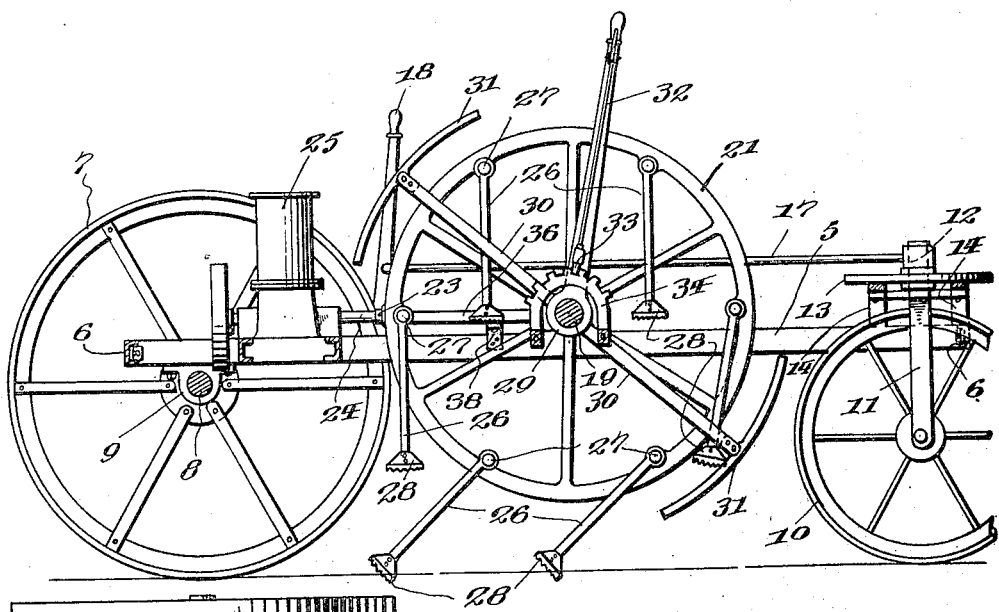
Fig. 2 is a plan view thereof.

Referring specifically to the drawing wherein like reference characters designate like parts throughout both views, numeral 5 denotes the side members of the tractor frame; 6 the cross bars at either end and 7 the rear wheels carried by an axle 8 journaled in bearings 9 secured to the rear portions of the side members 5. A single wheel 10 which serves as the guiding wheel is carried by forks 11, the upper vertical shank 12 of which is rotatably carried in a suitable bearing in the front end of the tractor frame. Above its bearing the shank 12 carries rigidly thereon a horizontal fourth wheel 13 for rotation with the shank on raised cross supports 14 when the front wheel 10 is turned through the medium of a lateral rod 15 having a pivotal connection 16 with the steering rod 17 connected to lever 18 which is secured at a convenient point at the rear of the tractor frame.

At a point preferably midway between the front and rear wheels, a transverse shaft 19 is journaled in bearings 20 of the side members 5 of the frame for rotation therein. Keyed or otherwise rigidly mounted on the shaft 19 between the side members 5 is a wheel 21 of such a diameter, that its outer periphery will be a considerable distance above the ground. This wheel 21 is the drive wheel of the tractor and comprises two opposed circumferential bevel gears 22 for engagement with a pinion 23 carried by the drive shaft 24 of the internal combustion engine 25 which is suitably mounted on the tractor frame toward the rear thereof.

At one side of the drive wheel 21 it carries a series of legs 26 rotatably hung from pins 27 which are arranged at intervals around its circumference. Calked feet 28 are rigidly fastened to the free ends of the legs 26 for engagement with the ground to propel the tractor when the drive wheel 21 revolves as will be presently described.

Figure 1:
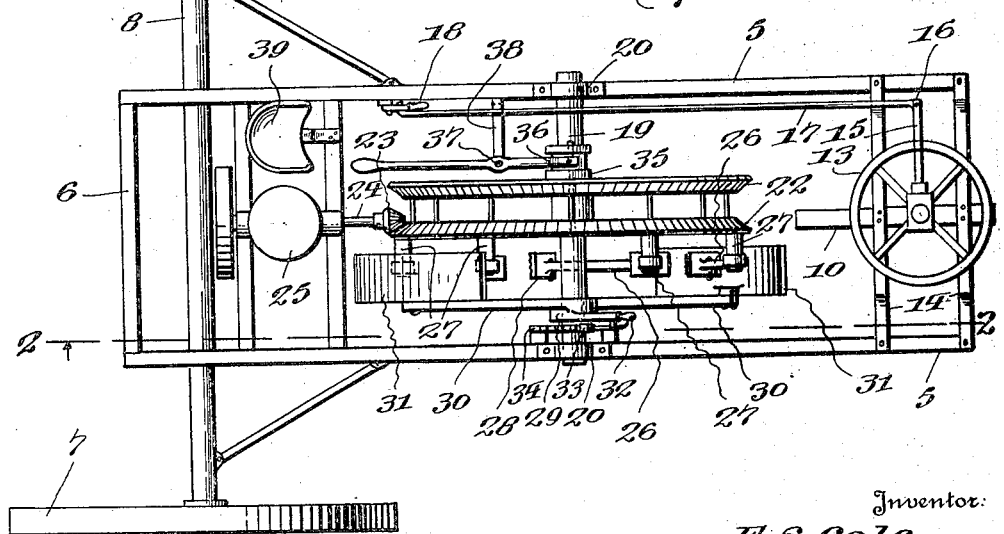
Figure 1 is a side elevation of a tractor embodying my invention.

It will be apparent that in order for the feet 28 to propel the tractor by contact with the ground, they must strike the ground at an angle as illustrated in Figure 1 of the drawing. As a means to accomplish this end and to adjust the angle at which the feet strike, according to the character of the ground or the weight of load to be drawn, I provide on the shaft 19 adjacent the wheel 21 at the side thereof from which the legs 26 depend, a loose collar 29 having diametrically opposite radial arms 30 extending beyond the periphery of the wheel 21 and carrying at their outer ends suitable guide members 31 for contact with the feet 28 as they near the ground to direct them thereinto at an angle. This angle may be varied through adjustment of the guides by means of the lever 32 with its finger 33, for engagement with the notches of the quadrant 34 which is mounted on the side member 5 of the frame.

Any suitable means for reversing the wheel 21 or throwing it out of gear may be provided, but I have illustrated as a convenient means, a grooved collar 35 keyed to the shaft 19 adjacent the opposite side of the wheel 21 from that carrying the legs 26, and a forked arm 36 operating in the groove of said collar to slide the shaft 19 laterally to disengage the pinion 23 from a bevel gear 22 to place it in neutral position or into engagement with the other bevel gear 22 for reversing the wheel. This forked arm 36 is pivoted at 37 to a bracket 38 of the tractor frame. Of course it will be understood that when the wheel 21 is to be reversed, the guides 31 must be reversed also to bring a guide into the path of the descending feet.

An operator's seat 39 may be located at a convenient point at the rear of the frame from which he may control the machine.

From the foregoing description read in connection with the accompanying drawings it is thought that the construction and operation of my tractor will be obvious. By using propelling wheel 21 with its feet, and their adjustable guides 31 it will be apparent that great leverage will be had and a relatively low powered motor may be made to pull comparatively heavy loads. It will also be seen that the tractor will not bury itself when used in soft ground to pull too great a load, since the driving wheel does not come in contact with the ground.

In accordance with the patent statutes, I have illustrated my invention in concrete form and as operating in a specified manner but it will be understood that the same is capable of various changes and modifications within the spirit of the invention, the scope of which is set forth in the appended claims.

I claim:

1. A tractor comprising a wheeled frame, a rotatable element carried by said frame, rotatable pendant arms carried by said rotatable element, reversible and adjustable guides rigidly connected and simultaneously movable, the one to and the other from operative position for angularly directing said arms into the ground, and a driving means for said rotatable element.

2. A tractor comprising a wheeled frame, a rotatable shaft carried by said frame, a wheel keyed to said shaft and spaced from the ground, rotatable pendant arms carried by said wheel at one side thereof, guide members disposed beyond the periphery of said wheel and adjustable for angularly directing said arms into the ground, adjusting and locking means for said guide members, and a driving means for said wheel.

3. A tractor comprising a frame, a rotatable element carried by said frame, said rotatable element comprising spaced bevel gears, rotatable pendant arms carried by said rotatable element, adjustable guides for angularly directing said arms into the ground, a motor carried by said frame, said motor having a drive shaft and a pinion thereon, and means for selectively engaging either of said bevel gears with said pinion.

4. A tractor comprising a wheeled frame, a rotatable shaft journaled in said frame, a wheel keyed to said shaft and spaced from the ground, rotatable pendant arms carried by said wheel at one side thereof, guide members disposed beyond the periphery of said wheel and in the same plane with said arms, means associated with said frame for adjusting said guide members to angularly direct said arms into the ground, a driving means for rotating said wheel, and means associated with said frame for lateral movement of said shaft for engaging or disengaging said wheel with said driving means.

5. A driving mechanism for tractors and the like comprising a rotatable element, rotatable pendant arms carried by said rotatable element, a pair of rigidly connected and simultaneously movable guides carried beyond the path of said arms and selectively movable into the path thereof for angularly directing said arms into the ground and driving means for said rotatable element.

6. A driving mechanism for tractors and the like comprising a rotatable element, rotatable pendant arms carried by said rotatable element, a pair of diametrically opposite and rigidly connected guide members located beyond the path of said arms, said guide members having a common pivot and being selectively movable into the path of the arms for angularly directing said arms into the ground, and a driving means for said rotatable element.

In testimony whereof I affix my signature.

EUGENE S. COLE.